H. Aitken.
Treating Ores.
N° 94,374. Patented Aug. 31, 1869.
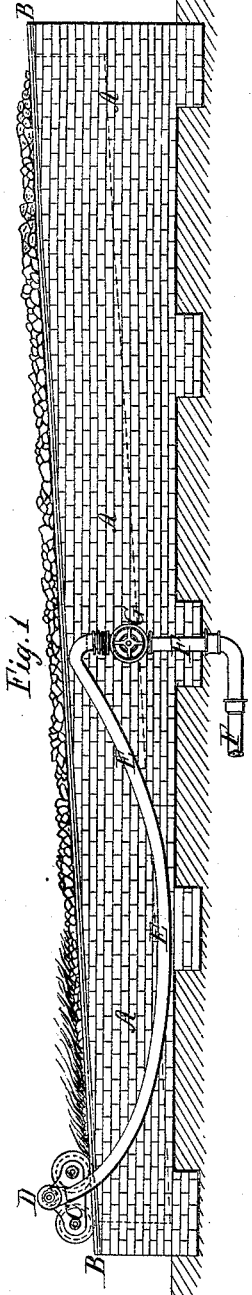
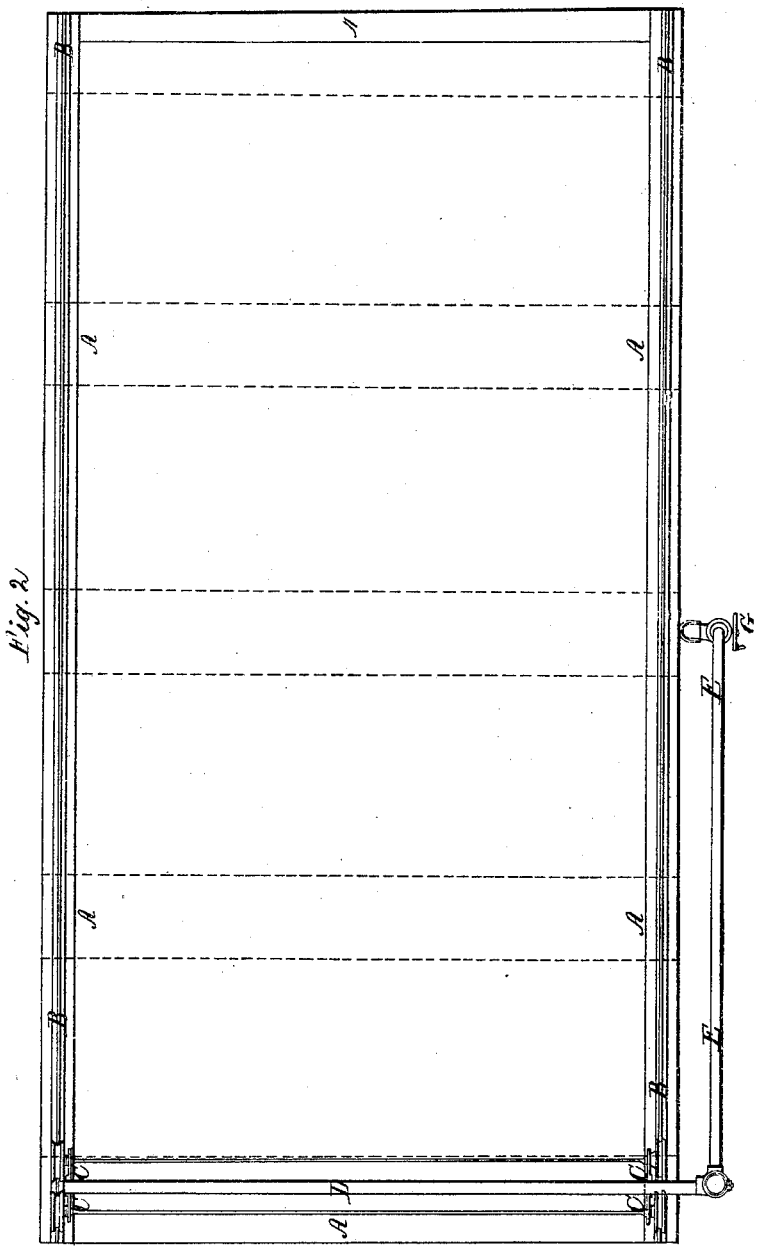
Witnesses
John Brown
W. J. A. Wood
Inventor
Henry Aitken

United States Patent Office.

HENRY AITKEN, OF FALKIRK, SCOTLAND.

Letters Patent No. 94,374, dated August 31, 1869.

IMPROVEMENT IN ROASTING AND TREATING IRON-ORES.

The Schedule referred to in these Letters Patent and making part of the same.

*To all whom it may concern:*

Be it known that I, HENRY AITKEN, of Falkirk, Sterling county, Scotland, have invented an Improvement in Treating Iron-Ores, Iron-Stones, &c.; and I do hereby declare the following to be a full, clear, and exact description of the same.

In the coking or carbonizing of iron-ores or iron-stones, it is the practice, as stated in Letters Patent Nos. 82,576, September 29, 1868, and 88,939, April 13, 1869, previously granted to me, to place the iron-ores or iron-stones to be coked or carbonized in close vessels, retorts, kilns, ovens, or in heaps covered over with some material, so as to, as much as possible, exclude the atmospheric air, or to treat them in chambers by means of a neutral flame.

The present invention, then, has for its object to supersede the method of coking or carbonizing iron-ores or iron-stones, above referred to; and It consists in coking or carbonizing, in contradistinction to roasting or calcining the iron-ores or iron-stones in the open air, on a platform or bed of clay, brick, stone, iron, or other material which may be situated horizontally, or at an angle to that position, (an angle of about one in fifteen is preferred,) or, in place of using a platform, the iron-ores or iron-stones may be placed in an open casing on the top of a blast-furnace, and, when coked or carbonized, dropped into the furnace; or they may be treated in an open tower or kiln.

The iron-ores or iron-stones to be coked or carbonized are placed on a platform or bed, or in an open casing on the blast-furnace, or in an open tower or kiln, and fired, commencing, by preference, in the case of the inclined platform or bed, along the lowest end or side, and the heap is allowed to burn until all, or nearly all, the volatile matters are driven off.

As the combustion of the mass proceeds, water is applied gradually to it, while still in a state of combustion, and before the air or oxygen therein has had sufficient time to consume the fixed carbon in the iron-ores or iron-stones; and, further, the iron-ores or iron-stones, being thus coked or carbonized, and watered out, may be removed for being reduced into pig-iron, malleable-iron, or steel.

During the time the iron-ores or iron-stones are burning, salt, steam, or water, as hereinbefore mentioned, or salt water, may be put among them, at intervals, so as to purify the iron-ores or iron-stones, or salt may be placed among the iron-ores or iron-stones as the heap is made up, or before it is fired.

Description of Drawings.

Figure 1 is a side elevation of an inclined platform, on which the iron-ores or iron-stones may be treated, and Figure 2 is a plan of the same.

The platform is shown, sloped at an angle of one in fifteen, and is composed of brick and surrounded by walls.

On the upper sides of the two longitudinal walls A, rails B are laid.

On these the carriages C, which carry the perforated pipe D, traverse.

The pipe D is coupled, by an elastic pipe, E, to the water-column F, which is fitted with a regulating-valve, G, so that the quantity of water may be regulated as required.

In treating iron-ores or iron-stones by means of the apparatus shown on the drawings, the heap or bing is fired at the lower end, and when all, or nearly all, the volatile matters are driven off, water is turned on and allowed to flow, through the perforations in the pipe D, until the combustion of that part of the heap, from which the volatile matters are wholly or partly driven off, is stopped. As the burning of the heap proceeds, the perforated pipe D is moved along the rails B until the entire mass or bing is thus treated.

The same perforated pipe D may be used for distributing salt water in or among the iron-stones during the time they are burning, for the purpose of purifying them.

In place of employing the perforated pipe D, and its connections, these may be dispensed with, and the iron-stones watered out by throwing water upon the burning portion of them, at the time when the volatile matters are entirely or nearly driven off, and salt water may also be thrown on, at intervals, in any convenient manner, for purifying them; or the use of water for cooling the iron-ores or iron-stones may be avoided, and the partly-burned mass may be turned over, spread, and watered out as soon as all, or nearly all, the volatile matters are driven off. And further, the iron-ores or iron-stones need not be cooled out, but when the volatile matters are as much as possible separated, the coked iron-ores or iron-stones may be at once transferred to a blast, or other furnace, for reduction into metallic iron or steel.

In place of damping out the iron-ores or iron-stones with water, they may be damped or cooled down by steam, applied by means of pipes passed through among or below the iron-ores or iron-stones.

Instead of placing the iron-ores or iron-stones on a bed or platform, they may be placed in an open tower or casing, and steamed or watered out, or drawn out as the coking or carbonizing proceeds, and at the same time be treated with steam, salt water, or salt, at intervals, as required for purifying them.

Holes or passages are formed at the lowest points of the bed or platform, so as to allow any surplus water to run freely away.

It may sometimes be desirable to desiccate the coked iron-ores or iron-stones. This may be done by forcing hot or cold air through or among them, either on the platform, in the open casing, or in the open tower, or after they are removed therefrom.

Having now described the nature of my said invention, and the system, mode, or manner in or under which the same is or may be used or practically carried into effect, I wish to observe, in conclusion, that I do not confine or restrict myself to the precise details herein referred to, as the same may be varied without departing from the principles or main features of my invention; but

What I consider novel and original, and therefore claim as the invention secured to me by the hereinbefore in part recited Letters Patent, is—

1. The treating of iron-ores or iron-stones by cooling down, in any of the modes herein set forth, after they are coked, that is, as soon as the whole, or nearly the whole of the volatile matters are driven off, so as to prevent, as much as possible, the destruction or waste of the fixed carbon.

2. The direct employment, in blast or other reducing furnaces, of the coked iron-ores or iron-stones, in the heated state, as soon as the whole, or nearly the whole of the volatile matters are driven off.

In testimony whereof, I have signed my name to this specification, in the presence of two subscribing witnesses.

HENRY AITKEN.

Witnesses:
JOHN BROWN,
WM. JAS. WOOD.